United States Patent

[11] 3,564,248

[72] Inventors: Eric C. Hopkinson;
Arthur H. Youmans, Harris County, Tex.
[21] Appl. No.: 686,397
[22] Filed: Nov. 29, 1967
[45] Patented: Feb. 16, 1971
[73] Assignee: Dresser Industries, Inc.
Dallas, Tex.
a corporation of Delaware

[54] METHOD AND APPARATUS FOR CALIBRATING PULSED NEUTRON WELL LOGGING INSTRUMENT
8 Claims, 4 Drawing Figs.

[52] U.S. Cl. .................................................. 250/83.3,
250/83, 250/83.6
[51] Int. Cl. ....................................................... G01v 5/00
[50] Field of Search ........................................... 250/83.6W,
83.3, 83C, 83.6W, 83.6, 83.1

[56] References Cited
UNITED STATES PATENTS

| | | | |
|---|---|---|---|
| 2,974,231 | 3/1961 | Greenblatt et al. | 250/83.6 |
| 2,991,364 | 7/1961 | Goodman | 250/83.6W |
| 3,358,142 | 12/1967 | Hopkinson et al. | 250/83.6W |
| 3,379,882 | 4/1968 | Youmans | 250/83.6W |

*Primary Examiner*—Archie R. Borchelt
*Attorneys*—Robert W. Mayer, Daniel Rubin, Peter J. Murphy, Douglas M. Clarkson, Roy L. Van Winkle and William E. Johnson, Jr.

ABSTRACT: A well logging instrument having a pair of radiation detector circuits and a pulsed neutron source are coupled through a cable to the surface electronics and calibration controls. A first switch is provided at the surface for causing the neutron source to operate continuously and a second switch is provided to effect a change in the gain of one of the radiation detector circuits, thus providing means for comparison of the sensitivities of the two detection circuits. An adjustable observation gate in the surface electronics, in conjunction with a digital time interval counter, is used to measure the time elapsed between sync pulses and the beginning and ending of each of the two detection gates.

METHOD AND APPARATUS FOR CALIBRATING PULSED NEUTRON WELL LOGGING INSTRUMENT

BACKGROUND OF THE INVENTION

This invention relates to the art of geophysical prospecting in general, and to the art of radioactivity well logging in particular. More particularly, it relates to improvements in the instrumentation and methods employed in such logging wherein the decay of thermal neutrons in the formations surrounding a borehole is measured.

In the copending application of Arthur H. Younmans, Ser. No. 292,927, now U. S. Pat. No. 3,379,882 assigned to the assignee of the present invention, there is described a system for radioactivity well logging wherein the formations are irradiated with neutrons from a periodically varying source operating at a repetition rate of the order of magnitude of hundreds or thousands of cycles per second, thus being alternately on and off for periods of hundreds of microseconds. A detecting system is synchronized with the source to operate while the source is off. The radioactivity well log which is normally conducted according to the system described in said copending application comprises a pair of counting rate curves plus a curve indicative of the rate of decline of the thermal neutron population which is a function of the ratio of the two counting rate curves. This curve is calibrated to record sigma, the thermal neutron capture cross section of the formation. The early gate, or $N_1$ curve, is in present commercial operation normally derived during the interval of 400—600 microseconds after time zero; that is, it is a measure of the radiation intensity detected during the interval from 400—600 microseconds after the termination of the neutron pulse from the neutron source. The late gate, or $N_2$ curve, is a similar measurement derived during the interval from 700—900 microseconds after time zero.

The present invention relates to an improvement upon the method and apparatus as described in said copending application and as such comprises, broadly, a method and apparatus for calibrating the detection circuitry associated with measuring the thermal neutron capture cross section of formations surrounding a borehole.

Therefore, the principal object of this invention is to provide an improved method and apparatus for determining geophysical characteristics of formations about a borehole;

It is a further object of this invention to provide an improved method and apparatus for neutron well logging based upon the decay of thermal neutrons in the formations;

It is yet another object of the invention to provide means for calibrating the detection circuitry and instrumentation associated with the logging of the thermal neutron capture cross section for formations surrounding a borehole.

The objects of the invention are accomplished, broadly, by providing methods and apparatus for precisely calibrating the time width of the detection gates, the width between the gates, and the time elapsed between a sync pulse and the beginning of the gates. Methods and apparatus are also provided to compare the widths of the gates by comprising the radioactivity detected during each of the gate intervals.

Other objects, features and advantages of the invention will become apparent from the following detailed descriptions, when considered with the accompanying drawings, in which.

Figure 1:
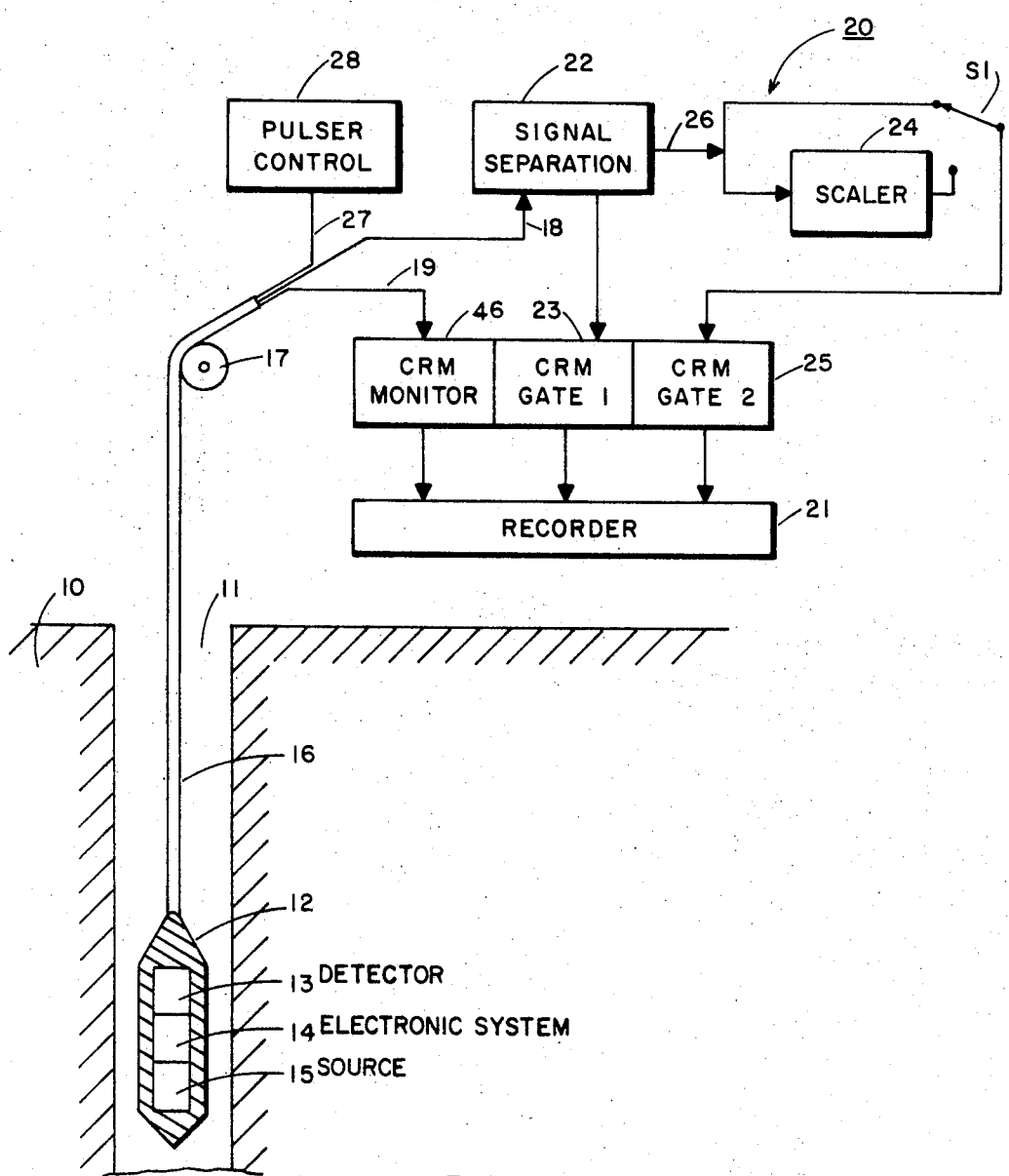
FIG. 1 is a side elevation view partly in section illustrating a system according to the invention, and the disposition of parts of parts of the system relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface 10 and may or may not be cased. Disposed within the well 11 is subsurface instrument 12 of the well logging system. Subsurface instrument 12 comprises a radiation detector 13, subsurface electronics 14 associated with detector 13 and a neutron source 15. Cable 16 suspends the instrument in the well 11 and contains the required conductors for electrically connecting the instrument with the surface apparatus. The cable 16 is wound on or unwound from drum 17 is raising and lowering the instrument 12 to traverse the well.

In making a radioactivity log of a well, instrument 12 is caused to traverse the well. Thereby neutrons from source 15 irradiate the formation surrounding the borehole and radiations influenced by the formations are detected by the detector 13. The resultant signals pass through electronic system 14 and pulses related to the detected radiations are sent up to the surface through cable 16. Through conventional slip rings and brushes (not illustrated) on the ends of the drum 17, the signals are conducted to the surface electronics, shown generally as reference symbol 20. A recorder 21 is driven through a conventional transmission system (not illustrated) in conjunction with the turning of the drum 17 so that the recorder moves in correlation with depth as the instrument 12 traverses the well 11. The elements are shown diagrammatically, and it is to be understood that the associated circuits and power supplies are provided in a conventional manner. It should also be understood that the housing for the instrument 12 is constructed to withstand the pressures and mechanical and thermal abuses encountered in logging a deep well, there being adequate space provided within it to house the necessary apparatus and to permit the transmission of radiation through it.

As is well known in the art of radioactivity well logging, the formation 10 is irradiated by neutrons exiting from a neutron source 15, for example, a D-T accelerator. These neutrons participate in elastic and inelastic collisions with the atoms contained in the various layers of the formation. Secondary radiation resulting from bombardment by the primary radiation in the form of neutrons from the source 15 is detected by the detector 13.

The measurement of the decline of thermal neutron population provides a means for determining a property of the material surrounding a borehole which is a definite, calculable, physical parameter, the macroscopic capture cross section of the formation.

Figure 2:
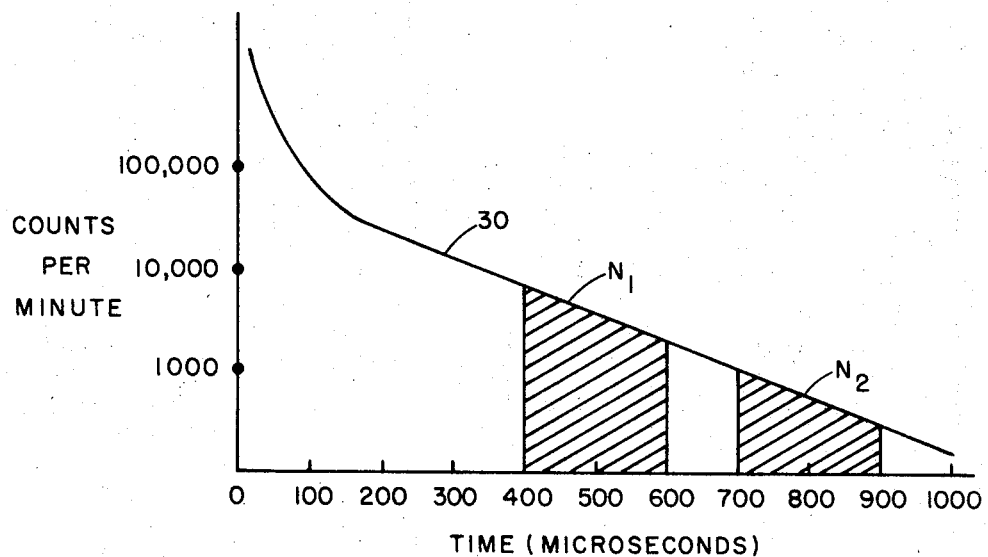
FIG. 2 is a schematic representation of the characteristic decay of the thermal neutron population following a burst of fast neutrons within the well.

FIG. 2 illustrates a counting rate curve 30 which is exemplary of the decline of the thermal neutron population following each neutron source pulse. The counting rates $N_1$ and $N_2$ are taken, respectively, during the periods of 400—600 and 700—900 microseconds following the neutron pulse. It should be appreciated that a comparison of the $N_1$ and $N_2$ counting rates, whether by merely comparing the two rates, or in fitting the numbers into a formula to derive the slope of the curve 30, is only as accurate as is the determination that the $N_1$ gate between 400—600 microseconds is, within tolerance, the same time duration as the gate between 700—900 microseconds, viz., the $N_2$ gate.

Figure 4:
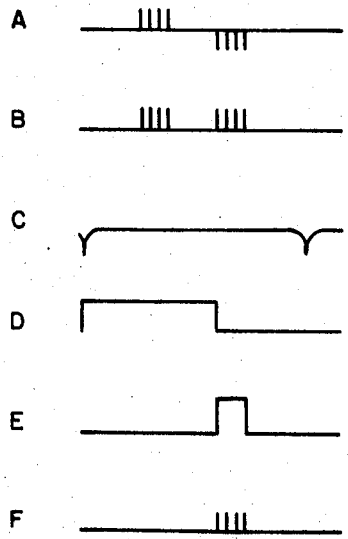
FIG. 4 is a schematic representation of electrical waveforms at designated points within the circuitry in FIG. 3.

Referring again to FIG. 1, the signals from detector 13 travels up the cable 16 through the conductor 18 to the signal separation circuit 22. The instrument 12 sends pulses over the cable with positive polarity from one gate and with negative polarity from the other gate, as shown at point A in FIG. 4. The signal separation circuit 22 couples the signals from gate 1 to the counting rate meter 23 and from gate 2 to the conductor 26. The conductor 26 is coupled through two paths, one going directly through the switch S1 and the other going through the scaler circuit 24 which is also connected to one of the contacts of the switch S1. The wiper arm of switch S1 is connected to the counting rate meter 25 for gate two. Since the switch S1 is included within the surface equipment, the scaler 24, for example a scale of 6, can be switched in to decrease the sensitivity of the detection and amplification circuitry for gate two. Since the factor of 6 is often employed in commercial logging to produce normalization of the two counting rate curves, the scaler circuit may be switched out of the circuit when logging and into the circuit when calibrating. It should be appreciated that since the second gate normally receives fewer signals during the normal logging operation, then either the rate meter or the recording medium would normally be such that the amplification factor for the second gate channel would be increase for calibration purposes. Therefore, the scaler circuit is chosen to exactly counteract that increased sensitivity. Thus, when the two gates are of equal duration, when the rate meters and the recorder are correct and linear, and when both gates are receiving equal radiation intensities (as during calibration from a continuous source), then the recorder will have equal deflection for both gate signals.

The monitor signal from the source 15 is coupled through the conductor 19 in the cable 16 into the counting rate meter 46. The outputs from the counting rate meters 23, 25 and 46 are each coupled into the recorder 21.

Conductor 27 in cable 16 connects the pulser control circuitry 28 to the neutron source 15. The pulser control circuit 28 has a switch in the surface equipment which controls the subsurface switch which will on command disable the neutron source pulser. The neutron source embodied in one type of instrument for producing the above-described measurement is disclosed in our U.S. Pat. No. 3,309,522, assigned to the assignee of the present invention. It is arranged to operate continuously when the pulser is disabled, thus producing a continuous, uniform neutron output. Thus, when the pulser control circuit 28 is used to disable the source pulser, the radiation intensity during the two gates is constant. Although the source pulser is inoperative, the detector gating system remains functional. Thus, the two gate signals will be the same within statistical accuracy if: (1) the two gates have the same width, (2) the two rate meters have equal sensitivity, (3) and the two recorders have equal sensitivity.

Thus there has been illustrated a pair of methods to calibrate the detector gating system, one of the methods being that of disabling the source pulser and measuring the radiation received during the two respective gates, the other method including the pulser being operative and switching a scaler circuit into the late gate to increase the sensitivity or amplification factor of the late gate channel.

Figure 3:
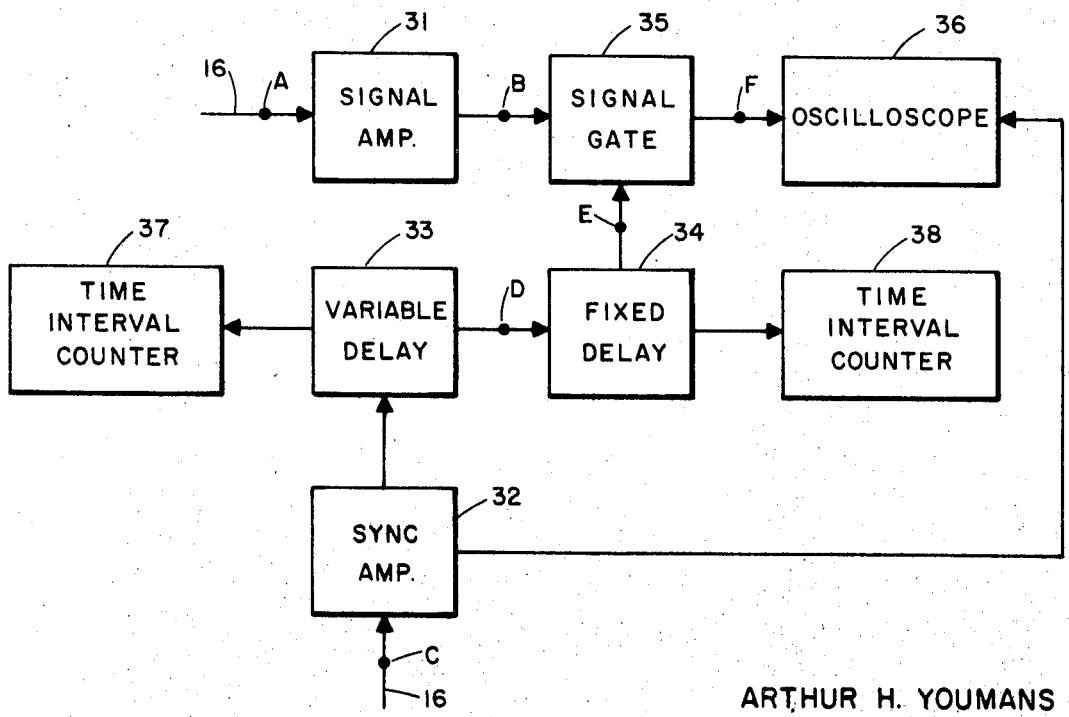
FIG. 3 is a block diagram of the surface electrons of a system according to the invention.

FIG. 3 illustrates a block diagram of the surface electronics according to the invention whereby means are provided to measure the time duration of each of the first and second detector gates, the duration between the sync pulse and the beginning of each of the gates, and the time duration between the two gates. The pulses from the subsurface instrument, for example, as illustrated in FIG. 1, are transmitted over the cable with a positive polarity from one gate and a negative polarity from the other gate, as shown at point A in FIG. 4. The signal amplifier 31 inverts the pulses from one channel so that all signal pulses are short duration pulses of the same polarity, for example as shown at point B of FIG. 4. It should be appreciated that the pulses at point A are of relatively long duration due to transmission over the cable, and that the amplifier 31 sharpens these pulses. A sync signal is coupled over the cable 16 from the neutron source circuitry within the downhole instrument into the sync amplifier circuit 32. The sync pulses occurring at point C serve as a reference point in determining the width of the gate and also the width between each of the gates as will be explained hereinafter. The sync pulses passing out of the sync amplifier are coupled into a variable delay circuit 33 which in turn is coupled into a fixed delay circuit 34 and into the signal gate circuit 35. Thus, at a time interval equal to the summation of the variable delay and the fixed delay, which occurs after the sync pulse, the signal pulses from the signal amplifier 31 are coupled through the signal gate 35 into the oscilloscope 36. The sync amplifier 32 is also connected to the oscilloscope 36 to serve as a reference base. In practicing the invention, the variable delay is adjusted until pulses are visible on the oscilloscope at point F. As mentioned above, the variable delay is triggered by the sync pulse, and when the variable delay plus the fixed delay exactly equals the interval between the sync pulse and the beginning of the first gate, there will be no pulses observed. However, when the variable delay is increased slightly, for example, one microsecond, then any pulse occurring from the signal amplifier 31 during the first microsecond of the first gate will be visible on the scope. By adjusting the variable delay, so that, for example, one pulse per second is observed on the oscilloscope, the time interval is thus adjusted to be within $[(1/N_1) \times (200)$ microseconds] of the beginning of the gate, $N_1$ being the number of pulses occurring during the time gate one is open. The variable delay circuitry 33 triggers the time interval counter 37, the counter being arranged to count the number of cycles generated by an oscillator, the oscillator being started by a pulse at the beginning of the variable delay and stopped at the end of the variable delay.

In a similar fashion, the beginning of the second gate is found by setting the variable delay plus the fixed delay to be an interval just barely fm the sync pulse to the start of the second gate.

In an analogous manner, the ends of the respective gates are found by setting the delay circuitry to be just barely less than the interval from the sync pulse to the end of the gate in question, the variable delay being adjusted until only one of a very few pulses appear on the scope. In a similar manner, the time interval counter 37 measures the variable delay. The fixed delay circuit 34 can also drive a second time interval counter 38 if desired. It should be appreciated that after measuring and establishing the beginning and end of each of gates one and two, it can then be determined whether the two gates have equal widths, as is normally desired, and the duration of the interval between the two gates will also be known.

Should it be desired to increase the efficacy of this calibration system by using a relatively high pulse rate during both gates, this may be accomplished with the logging neutron source turned off and a capsulated neutron source brought near the detector system while the downhold instrument is at the surface. The capsule neutron source should produce the same number of pulses during both gates, so that all gate limits can be detected with equal precision.

Should it be desired to achieve calibration while the instrument is in the borehole, the method described herein for disabling the source pulser to make the neutron source run continuously to produce a high number of pulses in both gates can be employed. An alternative embodiment would be to move the borehole instrument downward during the measurement so that oxygen activation enhances the number of pulses in both gates. In such a case, the first gate will nonetheless have the greater number of pulses but the variance will not be so great as with the instrument stationary or logging upward as in the normal logging operation.

An alternative embodiment to calibrate the gates according to the invention includes means for remotely reducing the subsurface discriminator (not illustrated). As is well known in the art, discriminators are commonly used in the detection circuits to eliminate or greatly reduce undesirable radiation signals. By reducing the discriminator level, there will be an increased number of pulses in both gates. A special effect of reducing the subsurface discriminator level is seen to result from the fact that the delay circuits which define the gates in the conventional subsurface instrumentation normally produce small voltage pulses at the beginning and end of each gate due to differentiation of the square voltage output of the multivibrator circuits. These voltage pulses, or spikes, are not related to the detected pulses but always occur in fixed relationship with the beginning and end of the gates. Under normal logging situations, wherein the discriminators are set at sufficiently high levels to eliminate background noises and the like, these pulses are so small that they do not trigger the discriminator. The discriminator level being reduced, however, the pulses appear at the surface as if they were detector pulses occurring at the beginning and end of each gate. Since these pulses are present during every cycle, they are more reliable and present more precise beginning and endings of the gates than do the random pulses which originate in the detector system.

Thus, there have been described, in conjunction with the illustrations herein, the preferred embodiments according to the invention for calibrating the gates in a pulsed neutron logging system which are used to determine the decay of the thermal neutron population following a burst of fast neutrons in a borehole. However, modifications of this invention other than those herein suggested will become apparent to those of ordinary skill in the art after reading this disclosure. For example, whereas the preferred embodiment uses a variable delay to measure the distance between a sync circuit pulse and the beginning of each of the two gates, it should be appreciated by those in the art that the invention could be employed to measure the distance between a sync pulse and some portion of a single gate and also to measure the width of a single gate. It could also be used to calibrate a system having more than two detector circuits, for example, one having three gates. Furthermore, although there has been illustrated a circuit having a single radiation detector therein, it should be appreciated that the system is equally operative with two detectors, each having independent circuits which are gated one or more times following each neutron burst. Therefore, it is intended that the matter contained in the foregoing description and the accompanying drawings be interpreted in an illustrative sense, and not in a limiting sense, when consideration is given to the appended claims.

We claim:

1. An apparatus for calibrating a radiation detection circuit in a well logging system having a first gate and a second gate, comprising:
   a recorder;
   means for coupling a signal from said first gate to said recorder;
   a scaler circuit; and
   a switch coupled between said second gate and said recorder for either coupling said second gate to said recorder or for inserting said scaler circuit between said second gate and said recorder, whereby said scaler circuit decreases the magnitude of the signal to be recorded from said second gate.

2. In a method for comparing the sensitivities of two gate circuits of a radiation detector in a well logging system wherein the second of said gate circuits receives fewer electrical signals than the first of said gate circuits during the logging of said well, comprising the step of switching an integral scaling factor into said second gate circuit.

3. A circuit for calibrating the gate of a detection circuit in a radioactive well logging system having a pulsed neutron source comprising:
   means for supplying a sync pulse functionally related to the pulsing of said neutron source;
   variable delay means triggered by said sync pulse;
   signal gating means in said detection circuit triggered by said variable delay means;
   monitoring means connected to said signal gating means, whereby said monitoring means provides an indication that said signal gating means has been triggered; and
   a time interval counter driven by said variable delay means, whereby said counter provides an indication of the time duration between said sync pulse and some portion of the time during which said detection gate is open.

4. A method for calibrating the gate of a detection circuit in a radioactive well logging system having a pulsed neutron source comprising:
   driving a variable delay circuit with a sync pulse functionally related to the pulsing of said neutron source;
   driving a signal gate in said detection circuit with the output of said variable delay circuit;
   coupling the output of said signal gate to a visible monitor;
   adjusting said variable delay circuit until the signals passing through said signal gate first commence to be observed on said visual monitor; and
   measuring the time elapsed during said variable delay.

5. A method for determining the time elapsed between a sync pulse and the beginning of a signal gate comprising:
   driving a variable delay circuit with said sync pulse;
   gating the output from said signal gate with the output from said variable delay circuit;
   coupling the output from said signal gate to a visible monitor;
   adjusting said variable delay circuit until the output from said signal gate first commences to be observed; and
   measuring the time elapsed during said variable delay.

6. A method for determining the time elapsed between a sync pulse and the end of a signal gate comprising:
   driving a variable delay circuit with said sync pulse;
   gating the output from said signal gate with the output from said variable delay circuit;
   coupling the output from said signal gate to a visible monitor;
   adjusting said variable delay circuit until the output from said signal gate first commences to be observed; and
   measuring the time elapsed during said variable delay.

7. The method for determining the thermal neutron capture cross section of the formations surrounding a borehole comprising:
   determining the beginning and ending of each of a first gate and a second gate in a radiation detector circuit relative to the pulsing of a pulsed neutron generator;
   radiation said formations with fast neutrons from said generator;
   counting the radiation rates in said first and second gages;
   computing the decline of the thermal neutron population from said counting rates; and
   correcting said computation with the determinations made with respect to said first and second gates.

8. The method of calibrating a radiation detection circuit in a well logging apparatus having a first gate and a second gate, and a pulsed neutron generator capable of continuous mode, comprising:
   a. traversing the well borehole in a downward direction with the pulsed neutron generator in its continuous mode; and
   b. inserting a scaler into the output of said second gate having an amplification factor of 1/N, the output of the second gate being amplified N times the output of the first gate during a normal logging operation, the number N being any number.